United States Patent

Sipotz, Jr.

[11] Patent Number: 5,903,394
[45] Date of Patent: May 11, 1999

[54] ENHANCED BEAM SPLITTER ASSEMBLY

[75] Inventor: Joseph J. Sipotz, Jr., Bethlehem, Pa.

[73] Assignee: Lucent Technologies Inc., Murray Hill, N.J.

[21] Appl. No.: 08/984,249

[22] Filed: Dec. 3, 1997

[51] Int. Cl.$^6$ .......................... G02B 27/14; G01N 21/00
[52] U.S. Cl. .......................................... 359/629; 356/437
[58] Field of Search .................... 359/629, 811, 359/819, 618; 356/437

[56] References Cited

U.S. PATENT DOCUMENTS 4,966,462  10/1990  Novick ..................................... 356/437
5,055,696  10/1991  Haraichi et al. ...................... 250/492.2

OTHER PUBLICATIONS

MacBride et al., Effect of Temperature Variation of FT–IR Spectrometer Stability, Applied Spectroscopy, vol. 51, No. 1, pp. 43–50, Jan. 1997.

Nanometrics Operations Manual, Model 210 UV, p. 2–2.

Nanometrics Simplified drawing of Model 4000.

*Primary Examiner*—Georgia Epps
*Assistant Examiner*—Ricky Mack

[57] ABSTRACT

Measurement accuracy provided by an optical system that uses a beam splitter is maintained, by containing the beam splitter inside a housing and supplying a dry purge gas to the interior of the housing in the region of the beam splitter while the beam splitter acts on a light source of the optical system. Also, certain portions of the beam splitter where an adhesive mounting compound is applied, are masked from the light source thus avoiding contamination of the beam splitter and degradation in measurement performance of the optical system.

7 Claims, 2 Drawing Sheets

ADDED OVER BEAM SPLITTER

5,903,394

ENHANCED BEAM SPLITTER ASSEMBLY

BACKGROUND OF THE INVENTION

1. Field of the Invention

The present invention relates to a technique for enhancing measurement accuracy in an optical system, and particularly to a method of maintaining accurate measurements when using light sources and one or more beam splitter plates.

2. Discussion of the Known Art

When fabricating integrated circuit (IC) chips with complementary metal oxide semiconductor (CMOS) technology, it is necessary to measure accurately the thickness of oxide coatings on a substrate in the order of tens of Angstrom units, wherein one Angstrom equals $10^{-8}$ centimeters. An optical system for performing such measurements is part of, for example, the Nanometrics "NanoSpec" Model 4000 microscope. Two light sources, one of ultraviolet (UV) light and the other of white light, illuminate corresponding beam splitter plates inside a housing. The thicknesses of the beam splitter plates, and the condition of the plate surfaces, must be kept constant or else the accuracy of measurements produced by the microscope will be compromised.

It is known that the UV light ionizes oxygen inside a beam splitter housing of the microscope, and that ozone is produced as a result. Also, it has also been discovered that microscopic deposits build up over time on the beam splitter plates associated with both of the UV and the white light sources. Such deposits "haze up" the plates and can not be removed without damaging the plates. Because the overall thicknesses of the beam splitter plates are important factors in the microscope measurements, the hazed up plates must be replaced periodically, e.g., every three months during normal production use. And, substantial costs are incurred to replace and align beam splitter plates in any optical system.

SUMMARY OF THE INVENTION

According to the invention, a method of maintaining measurement accuracy in an optical system that incorporates a beam splitter, includes containing a beam splitter of an optical system inside a beam splitter housing, and supplying a dry purge gas to the interior of the housing in the region of the beam splitter when the beam splitter is acting on a light source of the optical system.

According to another aspect of the invention, an optical beam splitter housing assembly includes a housing body, a beam splitter frame mounted inside the housing body, and a gas inlet fixed on the housing body to communicate an outside supply of a dry purge gas with the interior of the housing body including the region at which the beam splitter frame is mounted.

According to another aspect of the invention, an optical beam splitter frame assembly includes a first frame part defining a frame opening, and an optical beam splitter plate mounted on the first frame part including a mounting compound that adheres the beam splitter plate to the first frame part. A second frame part is supported adjacent the beam splitter plate, and the second frame part is constructed and arranged to mask the mounting compound in the region of the beam splitter plate.

For a better understanding of the invention, reference is made to the following description taken in conjunction with the accompanying drawing, and the scope of the invention will be pointed out in the appended claims.

DETAILED DESCRIPTION OF THE INVENTION

Figure 1:
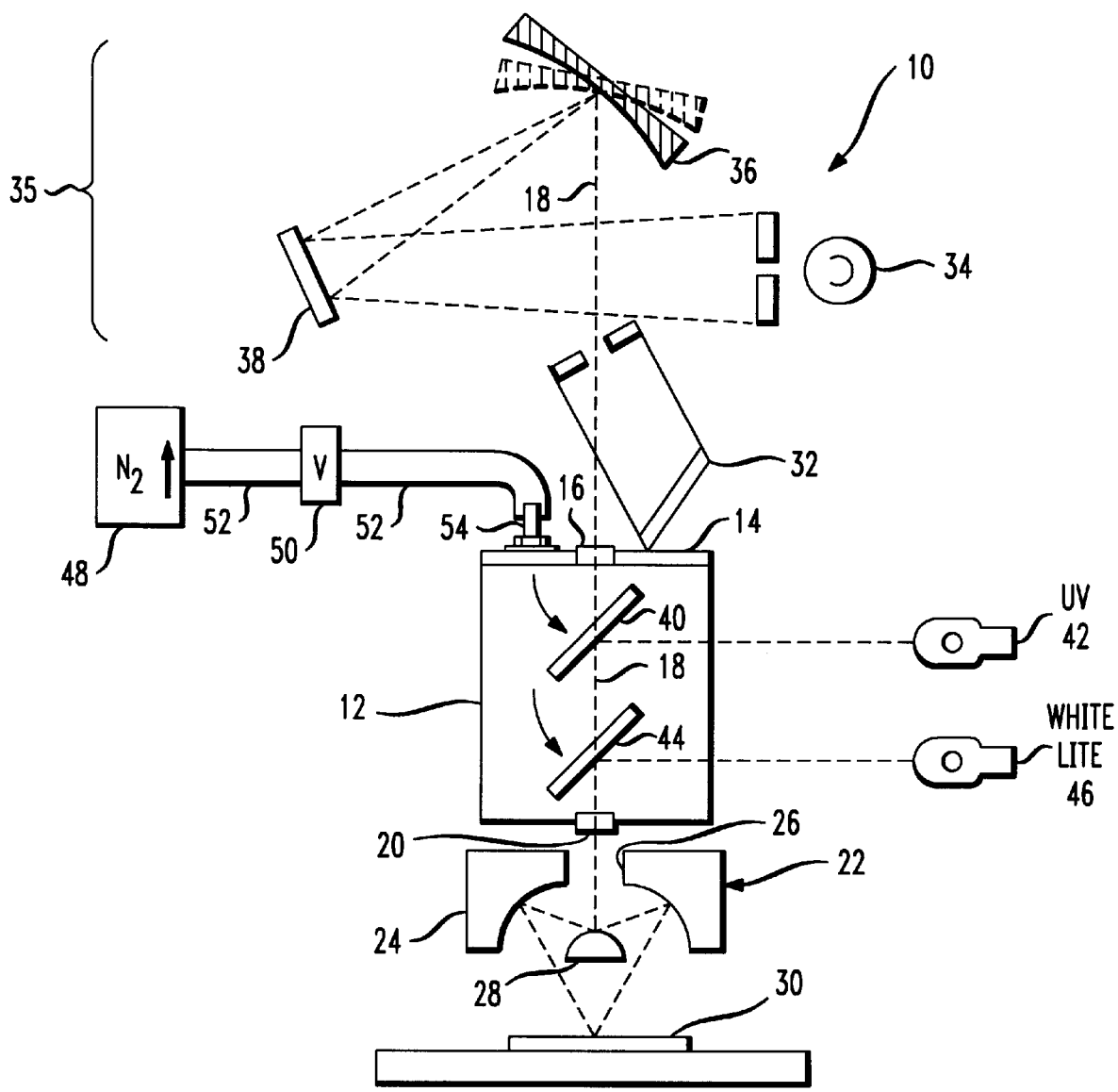
FIG. 1 is a diagram of an enhanced optical system in a measurements microscope according to the invention.

FIG. 1 is a diagram of an enhanced optical system of a measurements microscope 10, according to the invention. The microscope 10 includes a generally cylindrical beam splitter housing 12. The housing 12 includes a top plate 14 having a central opening 16 that is aligned with an optical axis 18 of the microscope. The housing 12 has a bottom opening 20 in alignment with the optical axis 18 and above an objective lens set 22. The lens set 22 is, for example, a 15-power lens arrangement including a curvilinear mirror 24 having a central opening 26 aligned with the axis 18, and a secondary reflecting element 28 as is known in the art. The thickness of, for example, an oxide coating on a specimen wafer 30 beneath the lens set 22, is determined by positioning the wafer 30 along the optical axis 18 by operation of coarse and fine focus controls (not shown) associated with the microscope 10. Movement of the wafer 30 in a direction perpendicular to the optical axis 18 is carried out, for example, via stage X and Y controls (not shown) associated with the microscope 10.

Optical alignment of the wafer 30 with the microscope 10 is carried out while viewing the wafer 30 through a microscope eyepiece 32 mounted above the top plate 14 of the beam splitter housing 12. Actual measurements of, e.g., oxide coating or film thicknesses on the wafer 30, are produced by processing output signals from a photomultiplier tube 34 which is mounted in an upper, spectrophotometer head 35 of the microscope 10. A diffraction grating 36 and a mirror 38 are also in the head 35 and direct images from the optical axis to the tube 34 as shown in FIG. 1.

A first beam splitter 40 is mounted inside the beam splitter housing 12 and traverses the optical axis 18 at a 45-degree angle, as shown. The first beam splitter 40 is illuminated by a source 42 of ultra-violet (UV) light when performing certain measurements with the microscope 10. A second beam splitter 44 is also mounted inside the housing 12 at a 45-degree angle with respect to the optical axis 18. During a measurement operation, the second beam splitter 44 is illuminated by a source 46 of white light.

A relatively low-pressure supply (e.g., six to eight p.s.i.) of a dry purge gas 48 such as nitrogen is fed through a manually operated valve 50 to the interior of the beam splitter housing 12 when one or both of the light sources 42, 46 are energized during operation of the microscope 10. The purge gas supply may be conducted, for example, via $\frac{1}{16}$-inch tubing 52 that connects to a hose fitting 54 (e.g., Clippard No. 11752-2) that is mounted in a threaded opening in the housing top plate 14. The fitting 54 is located to ensure that when the valve 50 is opened, a supply of nitrogen gas from the source 48 flows in the housing 12 in the regions of the first and the second beam splitters 40, 44, and the gas purges the interior of the housing 12 as it vents through the bottom opening 20 in the housing to the outside atmosphere.

Figure 2:
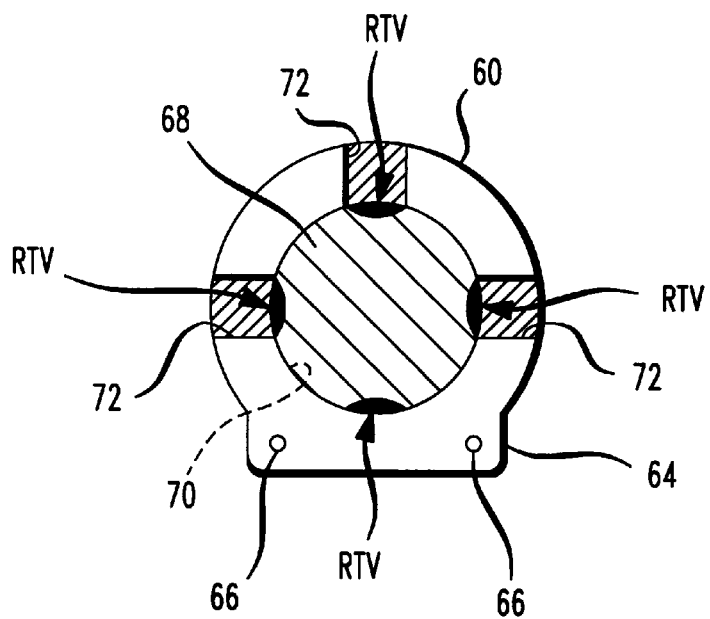
FIG. 2 is a plan view of a beam splitter plate mounted on a first mounting frame part.
Figure 3:
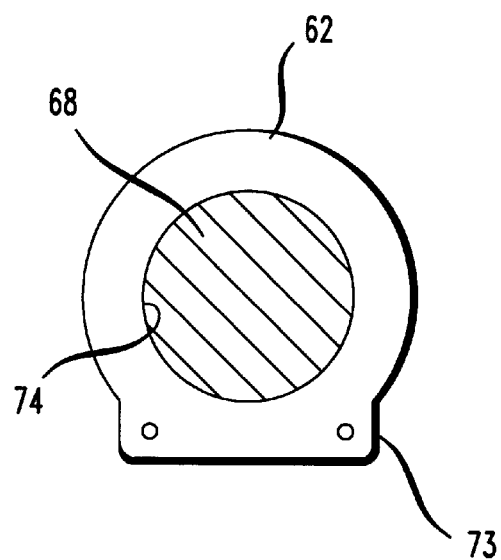
FIG. 3 is a plan view of a second mounting frame part supported adjacent the beam splitter plate in FIG. 2.

FIGS. 2 and 3 are plan views of beam splitter mounting frame parts, showing a first frame part 60 and a second frame part 62. The first frame part 60 is in the form of a flat annular ring having a base part 64. The base part 64 has a pair of mounting holes 66 through which a pair of screws (not shown) pass to secure the frame part 60 to an adjustable mount (not shown) inside the beam splitter housing 12. A quartz beam splitter plate 68 is seated to extend over a central frame opening 70 of the frame part 60. The first frame part 60 may have a recessed lip on the circumference of the frame opening 70 such that the beam splitter plate 68 nests in the frame part 60 with an upper surface of the plate 68 substantially flush with the surface of the frame part 60 shown in FIG. 2.

To mount the beam splitter plate 68 securely on the frame part 60, dabs of an adhesive compound such as silicone chalking or "RTV" are ordinarily applied at several locations on the circumference of the beam splitter plate 68 and on adjoining surfaces of the frame part 60. Several radially extending channels 72 may be formed in the surface of the frame part 60 adjacent the beam splitter plate 68, within which channels 72 the adhesive compound is confined on the frame part 60. As seen in FIG. 2, the adhesive compound is exposed on the frame part 60 and on the beam splitter plate 68.

According to the invention, the second frame part 62 (FIG. 3) is supported adjacent the beam splitter plate 68 adhered to the first frame part. The second frame part 62 is also in the form of a flat, annular ring and has an outer periphery that substantially matches the dimensions of the first frame part 60 in FIG. 2, including a base part 73 with a pair of mounting holes for registration with the base part 64 of the first frame part 60. The frame part 62 is made, for example, of 1/32-inch aluminum and is anodized black. The second frame part 62 when placed over the beam splitter plate 68 and the first frame part 60, preferably faces in the direction of the light source (i.e., UV source 42 or white light source 46) with which the beam splitter plate 68 is associated in the microscope 10 in FIG. 1. The second frame part 62 has a central opening 74 of a diameter less than that of the first frame part 60, so that a radially inner portion of the second frame part 62 masks portions of the adhesive compound that are exposed on the beam splitter plate 68 radially inward of the frame opening 70 in FIG. 2. Thus, when the second frame part 62 is mounted adjacent the first frame part 60 and the beam splitter plate 68, portions of the adhesive compound that would otherwise be exposed to UV or white light during operation of the microscope 10, are masked by the second frame part 62 from the light source or sources.

It is believed that absent the second frame part 62, exposed portions of the adhesive compound out-gas in response to the light sources, causing particles of the adhesive compound to deposit on and haze the beam splitter plates, and to fall through the bottom opening 20 onto the wafer 30 under test. Accordingly, hazing of the beam splitters 40, 44 in the microscope 10 is alleviated by the supply of nitrogen gas into the beam splitter housing, and by providing the second frame part 62 in the beam splitters 40, 44 in FIG. 1. Purging with a dry gas (e.g., nitrogen or dry air) through the housing 12 not only avoids out-gassing clouds from contacting the surface of the beam splitter plate 68, but avoids ozone production as well. The second frame part 62 masks the plate adhesive compound from the light sources and thus avoids potential photo-sensitive reactions from occurring in the first instance. The frequency of replacement and re-alignment of beam splitters in the microscope 10 can be extended from three months, to between nine months and one year even when operating the UV light source 42 continuously.

EXAMPLE I

The microscope 10 was operated with a new UV beam splitter 40 and without the addition of the second frame part 62, for 45 minutes with the gas supply 48 turned off. The UV source 42 was set to an output wavelength of 270 nm, and calibration of the microscope with 106 and 120 Angstrom standard films gave the following results:

| Calibration Standard | Microscope Reading |
| --- | --- |
| 106 A. | 96.3–97.8 A. |
| 120 A. | 109.5–110.0 A. |

Standard deviation over 10 readings: .09 to .10

EXAMPLE II

After performing the measurements in Example I, the supply 48 was activated to purge the beam splitter housing with nitrogen for bout 45 minutes. The UV source 42 output wavelength was set to 270 nm, and the following results were obtained:

| Calibration Standard | Microscope Reading |
| --- | --- |
| 106 A. | 108.2–109.5 A. |
| 120 A. | 118.4–119.6 A. |

Standard deviation over 10 readings: .04 to .05

While the foregoing description represents a preferred embodiment of the invention, it will be obvious to those skilled in the art that various changes and modifications may be made without departing from the true spirit and scope of the invention defined by the following claims.

I claim:

1. A method of maintaining measurement accuracy in an optical system that incorporates a beam splitter, comprising:

containing a first beam splitter of an optical system inside a beam splitter housing;

containing a second beam splitter of the optical system inside said housing;

supplying a dry purge gas to the interior of said housing in the region of said beam splitters; and carrying out the purge gas supplying step while illuminating the first beam splitter with a source of UV light and illuminating the second beam splitter with a source of white light.

2. The method of claim 1, including venting the interior of the beam splitter housing to the atmosphere outside of the housing thus purging the interior of the housing with said gas.

3. The method of claim 1, including masking certain portions of the first and the second beam splitters from the source of UV light and the source of white light wherein said portions are sensitive to said light sources.

4. An optical beam splitter housing assembly, comprising:

a housing body;

a beam splitter frame mounted inside the housing body; and a gas inlet fixed on the housing body for communicating an outside source of a dry purge gas with the interior of the housing body including the region at which the beam splitter frame is mounted;

wherein the beam splitter frame comprises a first frame part that defines a central frame opening, an optical beam splitter plate mounted on the first frame part and a mounting compound that adheres the beam splitter plate to the first frame part, and a second frame part supported adjacent the beam splitter plate, the second frame part being constructed and arranged to mask a portion of the mounting compound.

5. A housing assembly according to claim 4, wherein part of the housing body is constructed and arranged to vent the interior of the housing body to the atmosphere outside the housing body thus allowing the outside gas source to purge the interior of the housing body with a dry purge gas.

6. An optical beam splitter frame assembly, comprising:

a first frame part that defines a central frame opening;

an optical beam splitter plate mounted on the first frame part and a mounting compound that adheres the beam splitter plate to the first frame part; and a second frame part supported adjacent the beam splitter plate, wherein the second frame part is constructed and arranged to mask a portion of the mounting compound.

7. A frame assembly according to claim 6, wherein the first and the second frame parts are annular in shape, and the second frame part defines a second frame opening of a diameter less than a first frame opening defined by the first frame part, and a radially inner portion of the second frame part masks a portion of the mounting compound.

* * * * *